United States Patent
Huang et al.

(10) Patent No.: US 8,721,183 B2
(45) Date of Patent: May 13, 2014

(54) BEARING ASSEMBLY

(71) Applicant: Newcera Technology Co., Ltd., Bandar Seri Begawan (BN)

(72) Inventors: Lung-Wei Huang, Hsinchu (TW); Chao-Nien Tung, Hsinchu (TW)

(73) Assignee: Newcera Technology Co., Ltd., Bandar Seri Begawan (BN)

( * ) Notice: Subject to any disclaimer, the term of this patent is extended or adjusted under 35 U.S.C. 154(b) by 0 days.

(21) Appl. No.: 13/734,608

(22) Filed: Jan. 4, 2013

(65) Prior Publication Data

US 2013/0177268 A1 Jul. 11, 2013

(30) Foreign Application Priority Data

Jan. 10, 2012 (TW) .............................. 101100906 A

(51) Int. Cl.
*F16C 32/06* (2006.01)
*F16C 33/66* (2006.01)

(52) U.S. Cl.
USPC ........................................... 384/100; 384/399

(58) Field of Classification Search
USPC ......... 384/100, 107, 114, 204, 209, 213, 214, 384/276, 279, 286–290, 322, 397–400
See application file for complete search history.

(56) References Cited

U.S. PATENT DOCUMENTS

| 3,503,660 | A | * | 3/1970 | Hideo | ............................ 384/400 |
| 3,647,272 | A | * | 3/1972 | Dee | ............................ 384/114 |
| 3,721,480 | A | * | 3/1973 | Dee | ............................ 384/112 |
| 3,917,362 | A | | 11/1975 | Stedman | |
| 2006/0171618 | A1 | | 8/2006 | Shih | |
| 2009/0208153 | A1 | | 8/2009 | Yamashita et al. | |
| 2012/0082406 | A1 | * | 4/2012 | Tung et al. | ..................... 384/397 |
| 2012/0087609 | A1 | * | 4/2012 | Tung et al. | ..................... 384/397 |
| 2012/0093451 | A1 | * | 4/2012 | Tung et al. | ..................... 384/397 |

FOREIGN PATENT DOCUMENTS

| DE | 1400440 A1 | 4/1969 |
| EP | 2333364 A1 | 6/2011 |
| GB | 297875 A | 10/1928 |
| GB | 540865 A | 11/1941 |
| GB | 1389857 A | 4/1975 |

* cited by examiner

*Primary Examiner* — Thomas R Hannon
(74) *Attorney, Agent, or Firm* — Rabin & Berdo, P.C.

(57) ABSTRACT

A bearing assembly is formed by coupling at least two units together in an axially abutting manner. Each unit has two connection portions on two opposite ends and a mounting portion on a largest outer periphery. The connection portions between two adjacent units form at least one set of interfaces, each set having complementary shapes contact with each other. The mounting portion is securely encased in an inner periphery of a jutting chamber located at each end of a motor housing. At least one groove and notches are formed on at least one of two abutting connection portions between the two adjacent units. The notches communicate with the groove and an axle hole. In the assembly, the groove forms at least one storage chamber to store lubricating media, and the notches form at least one set of passages communicating with the storage chamber and an axial hole.

10 Claims, 14 Drawing Sheets

BEARING ASSEMBLY

FIELD OF THE INVENTION

The present invention relates to a bearing assembly, and particularly to a bearing assembly for high speed spinning shafts.

BACKGROUND OF THE INVENTION

Conventional bearings usually strain under a variety of severe operation conditions over long-term operation, such as heavy loading, high speed spinning, and severe environment conditions such as abnormal high or low temperature, strong vibration and the like. It could happen that lubricating media are gradually consumed and exhausted after a short period of operation. As a result of deteriorating tribology interface between peripheries of the spinning shaft and axial hole, the shaft could directly contact the axial hole to induce high frequency knocks and impacts, resulting in excessive abrasion and heat generation. This can lead to electric current increase, noise generation, shaft scraping, axial hole dilation, or shaft jam, which accelerates damage of the bearing. All of these are critical technical problems of the conventional bearing to be resolved.

To maintain smooth operation of the bearing under the aforesaid severe operation and environment conditions for a prolonged period of time requires forming a tribology interface between the peripheries of the axial hole and the spinning shaft to support the shaft. To resolve these problems, sufficient lubricating media must be evenly and smoothly replenished and recycled. Other factors, such as simplified fabrication process to facilitate mass production, desirable cooling capability of the tribology interface, sturdiness and durability of total structure, adjustability of locations and capacities of lubricating media passages and storage chamber, and flexibility of employing diversified lubricating media at the same time or individually, also are important. The aforesaid lubricating media can be any substance that can provide desired lubrication effect between the spinning shaft and axial hole of the bearing including but not limited to oil of relatively lower viscosity, lubricants of higher viscosity such as grease and hybrid lubricants contained solid lubricating grains.

US 2006/01716181A1 proposes a self-lubrication bearing with a hollow assembly coupled on a shaft. The assembly has T-shaped two-stepped cylindrical struts coupled together through a smaller end to form an indented circumference, and a hollow barrel casing coupled on the assembly to form a storage chamber between them to store lubricating oil. A gap is formed on the connection surface of the storage chamber to allow the lubricating oil to seep and flow into the axial hole. However, lubricants of a higher viscosity cannot be used on the aforesaid bearing.

US 2009/0208153A1 discloses a fluid lubricating bearing including a housing, a bearing sleeve fixed onto the housing and a shaft portion which rotates relative to the housing and the bearing sleeve. Radial hydrodynamic grooves are arranged on the inner circumferential surface of the bearing sleeve. Thrust hydrodynamic grooves are arranged on the lower and upper end face of the bearing sleeve. Also, an annular sealing space formed integrally with the side portion of the housing. While the shaft is in rotation, the lubricating oil is driven by the radial and thrust hydrodynamic grooves to flow around the outer periphery faces and the inner periphery faces of the bearing sleeve to complete the circulation loop. The bearing sleeve is the only unit to support the shaft portion and the lubricating oil is circulated one-way through the loop. Also, the bearing lacks adjustability of the locations and capacities of the lubricating oil passages and storage.

GB 1389857A discloses another type of self-lubrication bearing with a hollow cylindrical barrel made from plastics by injection to couple on a shaft. The plastic unit has a plurality of protrusive fin-shaped circular rings formed radially and spaced from each other axially, and a hollow barrel casing to couple on the circumference of the plastic unit so that adjacent circular rings form a plurality of annular storage chambers to store lubricating media. The lubricating media can seep and flow into the axial hole through multiple apertures formed in the storage chambers. The bearing made with a metal or ceramic requires other types of fabrication process have to be adopted. The structure is more complex, and mass production is more difficult.

U.S. Pat. No. 3,917,362A discloses a self-lubrication bearing formed by coupling a hollow assembly on a shaft. The assembly has an annular groove formed radially in the center of the circumferential surface. A hollow barrel casing is provided to couple on the circumferential outer surface of the assembly so that the groove forms an annular storage to store lubricating grease. The groove has a plurality of apertures formed thereon to allow the lubricating grease to seep into the axial hole.

GB 297875, EP 2333364, DE 1400440 and GB 540865 also disclose bearings including different lubricating means.

All the aforesaid conventional bearings do not provide a dynamic pressure and a lubricating media replenish and recycle mechanism.

They also lack adjustability on the locations and capacities of the lubricating media passages and storage chamber, and flexibility on employing diversified lubricating media. Their complex structures also limit miniaturization and mass production applicability, and make the costs higher and heat dissipation more difficult. Hence they are severely constrained in the applicability for the severe operation environments of abnormal high or low temperature, high spinning speed or the like. In other demanding operation environments such as high loading and strong vibration, the total structural strength is an even more important consideration.

SUMMARY OF THE INVENTION

The primary object of the present invention is to overcome the aforesaid disadvantages of the conventional techniques by providing a bearing assembly formed by at least two units axially coupled together in abutting manner. Each unit includes two opposite ends formed respectively, a connection portion, and a mounting portion on a largest outer peripheral surface. The connection portions between two adjacent units of the bearing assembly form a pair of interfaces with complementary shapes so as to contact with each other. The mounting portion of each unit is formed in a shape and size mating tightly coupled on an inner wall surface of a jutting chamber extended outwards from a center of each of two ends of a motor housing in the art to allow the bearing assembly to be securely held in the jutting chamber. Each unit has an axle hole axially running through the two opposite ends thereof. The axle holes of the at least two units form an axial hole of the bearing assembly for insertion of a spinning shaft to be supported and lubricated. At least one groove and at least one set of multiple notches communicating with the groove and the axial hole are formed between at least one of the two adjacent units of the bearing assembly. The at least one groove of the two adjacent units of the bearing assembly are coupled with each other and fixedly encased in the jutting chamber of the motor housing to form at least one storage chamber to store lubricating media. The at least one set of multiple notches form at least one set of multiple passages between the at least one of the two adjacent units of the bearing assembly to communicate with the at least one storage chamber and the axial hole.

The invention provides a composite bearing platform of the bearing assembly without the need of an outer shell that allows the units to be directly installed in the motor housing for long term structural integrity during operation to achieve the effect of adjusting the loading length and evenly distributing the lubricating media.

The invention provides a product platform of the bearing assembly with a greater storage capacity to store diversified lubricating media, and can greatly extend and upgrade operation limits and lifespan.

The invention provides a structure platform of the bearing assembly with a stronger total structure and improved cooling capability to enhance loading capability and vibration resistant capability.

The invention provides a production platform of the bearing assembly with a modular design and simplified fabrication process for mass production that require fewer elements to facilitate miniaturization and reduce the cost.

The invention provides a novel lubricating mechanism of the bearing assembly that provides powerful support for the spinning shaft and generates continuous dynamic pressure and can replenish and recycle the lubricating media.

The invention provides a developing platform of the bearing assembly with flexible designs and versatile applications to meet requirements of diversified industries in varying tribology conditions.

The foregoing, as well as additional objects, features and advantages of the invention will be more readily apparent from the following detailed description, which proceeds with reference to the accompanying drawings.

DETAILED DESCRIPTION

Figure 1:
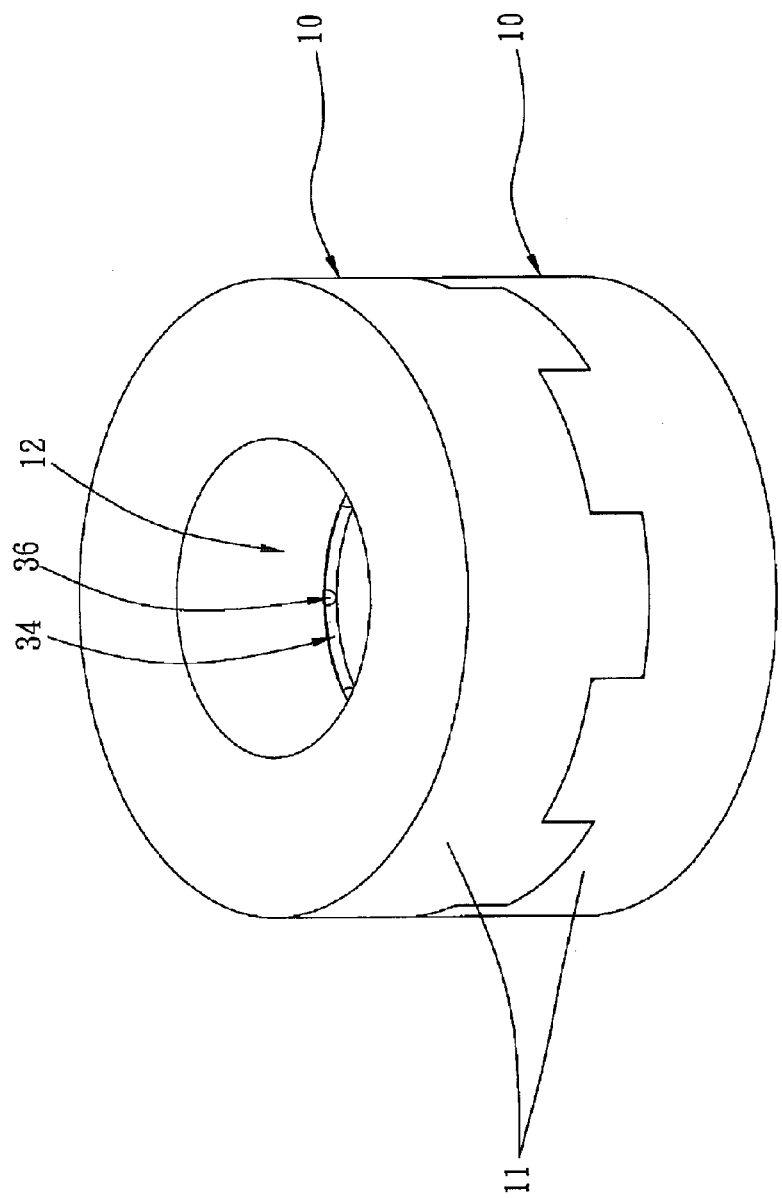
FIG. 1 is a schematic, isometric view of a bearing assembly according to a first embodiment of the invention.
Figure 2:
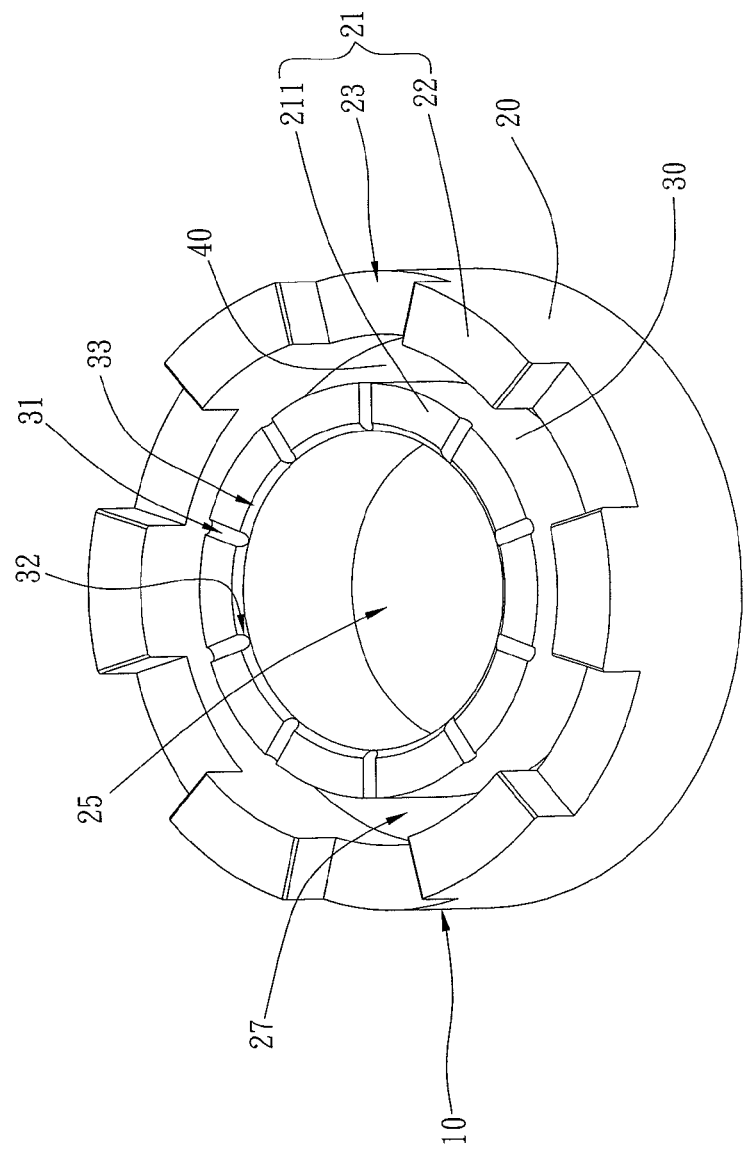
FIG. 2 is a schematic, isometric view of a unit illustrated in FIG. 1.
Figure 3:
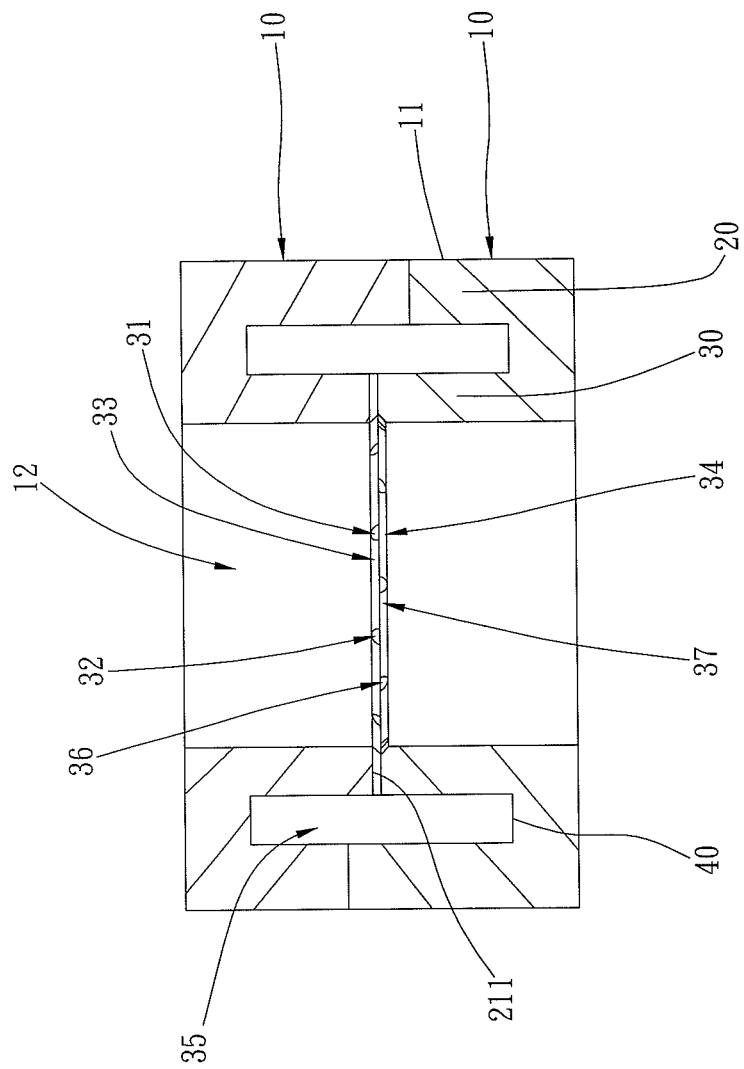
FIG. 3 is a cross section view of the bearing assembly illustrated in FIG. 1.
Figure 4:
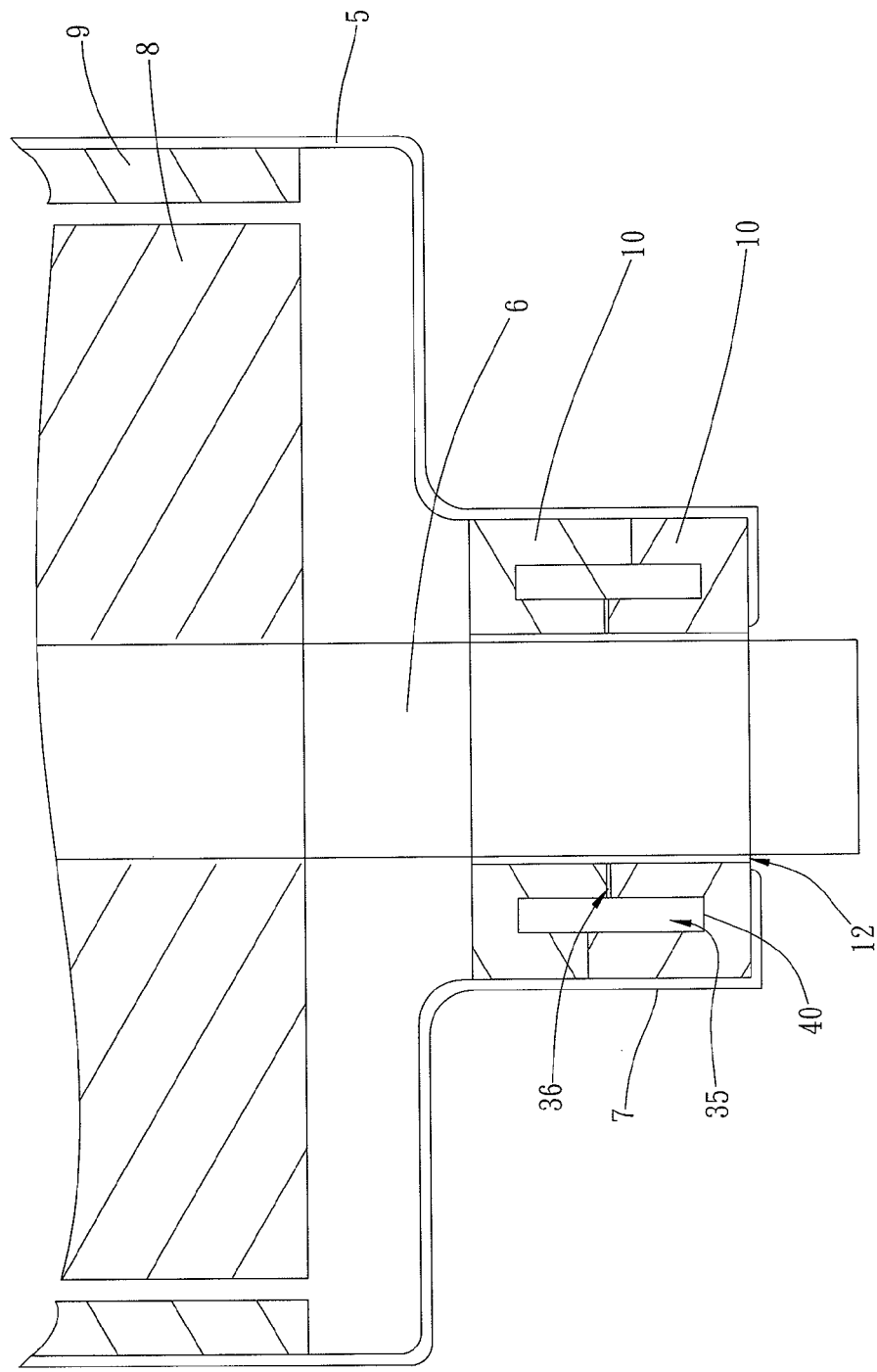
FIG. 4 is a cross section view of the bearing assembly illustrated in FIG. 3 installed on one end of a motor housing.

Reference will now be made to the drawings to describe exemplary embodiments of the present bearing assembly in detail.

Referring to FIGS. 1-4, a bearing assembly according to a first embodiment of the invention, includes two identical units 10 axially coupled together in abutting manner to form a cylindrical shape with a hollow axial hole 12 inside. The unit 10 is made from a dense or porous material and has an axle hole 25 axially running through two opposite ends thereof. The axle holes 25 of the two units 10 form the axial hole 12 of the bearing assembly. Each unit 10 includes the two opposite ends formed respectively a connection portion 21, and a mounting portion 11 on a largest outer peripheral surface. The connection portions 21 between two adjacent units 10 of the bearing assembly form a pair of interfaces with complementary shapes so as to contact each other. The mounting portion 11 of each unit 10 is formed in a shape and size mating tightly coupled on an inner wall surface of a jutting chamber 7 extended outwards from the center of each of two ends of a motor housing 5 in the art to allow the bearing assembly to be securely held in the jutting chamber 7. Then a shaft 6 which supports a motor stator 8 running through a magnetic ring 9 on an inner wall of the motor housing 5 is inserted into the axial hole 12. The unit 10 also has a groove 27 axially indented from one of the end surfaces of a connection portion 21 towards a bottom wall 40 thereof. The groove 27 is annularly formed between an outer wall 20 near the mounting portion 11 and an inner wall 30 near the axle hole 25. In practice, the groove 27 can be formed in different sizes and shapes. In various embodiments herein, a typical groove 27 having a cross section formed in a rectangular shape serves as an example to facilitate discussions. On a free end of the inner wall 30 has multiple notches 31 radially formed thereon and communicating with the groove 27 and the axle hole 25. The axle hole 25 has a wall surface at one end formed a trench 33 with an enlarged opening thereon directing towards the connection portion 21. The trench 33 communicates with the recesses 32 corresponding to the notches 31 on the wall surface of the axle hole 25. The outer wall 20 also has a free end. Both the free ends of the outer wall 20 and the inner wall 30 of one of the two adjacent units 10 further have one set of connection portion 21 connecting axially to another set of connection portion 21 formed on another one of the two adjacent units 10 in an opposite manner. In this embodiment the connection portion 21 on the outer wall 20 is a plurality of tenons 22 and a plurality of slots 23 formed at the same length and width neighboring to each other and having complementary shapes. The connection portion 21 on the inner wall 30 is a free end surface 211 separated by the plurality of notches 31. Thus the bearing assembly is formed by the tenons 22 and the slots 23 on the two abutting outer walls 20 axially coupled with each other, meanwhile, the free end surfaces 211 on the two abutting inner walls 30 connect to each other. As such, the two grooves 27 between the two adjacent units 10 are joined to form an annular storage chamber 35 to store lubricating media, which has a capacity twice that of the groove 27. The two sets of multiple notches 31 between the two adjacent units 10 form a set of multiple staggered passages 36 to convey the lubricating media into the axial hole 12 to lubricate the shaft 6. The passages 36 have an equivalent hydraulic diameter twice that of the notches 31. The two abutting trenches 33 are joined to form an annular ditch 34 to communicate with multiple passage ports 37 corresponding to the passages 36 on the wall surface of the axial hole 12. Each annular ditch 34 has a V-shaped cross section gradually shrunk upon viewing towards the passage ports 37. The passages 36 communicate with the storage chamber 35 and the axial hole 12. The lubricating media can be lubricating oil or lubricating grease with a viscosity greater than the lubricating oil, or lubricants containing solid lubricating grains that have a higher viscosity than the lubricating oil.

The bearing assembly of the invention can be made by mass production via precision punch molds to achieve required dimensional accuracy of the modularized units 10 and the bearing assembly, and also the axial hole 12 formed by the axle holes 25 is precise coaxially to facilitate control and improve quality in mass production. Further, since each unit 10 of the bearing assembly has the entire outer peripheral surface serving as the mounting portion 11, so that when the bearing assembly is tightly contacted with the inner wall surface of the jutting chamber 7 with a maximum contact area, total structural strength and heat conductivity of the bearing assembly are enhanced directly, thus loading and vibration-resistant capabilities also can be improved. Thereby in the bearing assembly, the structure can be simplified and the number of composite elements can be reduced so as to store adequate lubricating media in a limited accommodating space of jutting chamber 7. The lubricating media can be filled the storage chamber 35 by a vacuum impregnation method before encasing in the chamber 7 or directly injected through the passage ports 37 of the axial hole 12 after encasing in the chamber 7.

When the shaft 6 spins in the axial hole 12, the lubricating media in the storage chamber 35 are expanded due to receive heat generated by tribology. As a result, the viscosity of the lubricating media decreases and fluidity increases. Hence the lubricating media flows through the passages 36 to the axial hole 12. In addition, during spinning of the shaft 6, a centrifugal force is generated to lower the pressure of the passages 36 towards the axial hole 12, while the pressure towards the storage chamber 35 is higher, such a pressure difference at the two ends of the passages 36 can further push the lubricating media from the storage chamber 35 to the axial hole 12, thereby the quality of the tribology interface formed between the axial hole 12 and the shaft 6 and tribology duration can be improved greatly over the conventional self-lubricating bearings just impregnated in advance with lubricating oil of a lower viscosity. Moreover, the units 10 can also be made of porous material impregnated in advance with lubricating oil, aside from the lubricating media supplied through the storage chamber 35 and the passages 36 via the lubricating mechanism between the axial hole 12 and the shaft 6 as previously discussed, the oil-contained porous material also can supply the lubricating oil via capillary forces, thereby providing an even better tribology interface to enhance the lubricating effect.

Furthermore, when the shaft 6 is spinning in the axial hole 12, it rotates and squeezes the lubricating media in the annular ditch 34 formed with a gradually shrunk cross section and converges the lubricating media supplied by a passage 36 approaching the shaft 6 to form a dynamic pressure to support the shaft 6, and immediately pushes the lubricating media into the storage chamber 35 via another adjacent passage 36. Then the shaft 6 spins along the annular ditch 34 and approaches a next passage 36 to start supplying the lubricating media, hence another dynamic pressure to support the shaft 6 is generated as previously discussed, and the lubricating media also are pushed into the storage chamber 35 via another adjacent passage 36. As such, the lubricating media through the passages 36 cyclically replenish from the storage chamber 35 to the axial hole 12 and recycle from the axial hole 12 to the storage chamber 35 in a back-and-forth fashion, and provides a novel multi-channel dynamic-pressure and recyclable lubricating mechanism continuously generate a powerful dynamic pressure to support rapid spinning of the miniaturized shaft 6, which can further enhance loading capacity and vibration resistant capability.

The storage chamber 35 provided by the invention can be formed in varying capacities and profiles, such as lozenge, curved, polygonal or the like, depending on the axial cross section of the groove 27 of the adjacent units 10. The profiles of the storage chamber 35 depicted in the embodiments are merely examples and not the limitation of the invention.

By adjusting the shape, number and size of the notches 31, the invention can provide steady flow of the lubricating media from the storage chamber 35 via the passages 36 to between the inner wall surface of the axial hole 12 and the outer wall surface of the shaft 6 in response to different tribology conditions, thereby upgrade operation limit and lifespan of the bearing assembly.

The invention provides a bearing assembly improved heat conductivity. By directly and tightly encasing the units into the jutting chamber of the motor housing in the art, fewer elements are needed and miniaturization of the bearing assembly can be realized. Thus the invention also provides a shorter cooling path that can improve heat conductivity of the tribology interface and also enhance total structural strength, and increase shaft loading and vibration resistant capability.

The invention provides a novel lubricating mechanism that can continuously generate the dynamic pressure for supporting shaft and replenish and recycle the lubricating media in a back-and-forth fashion.

Figure 5A:
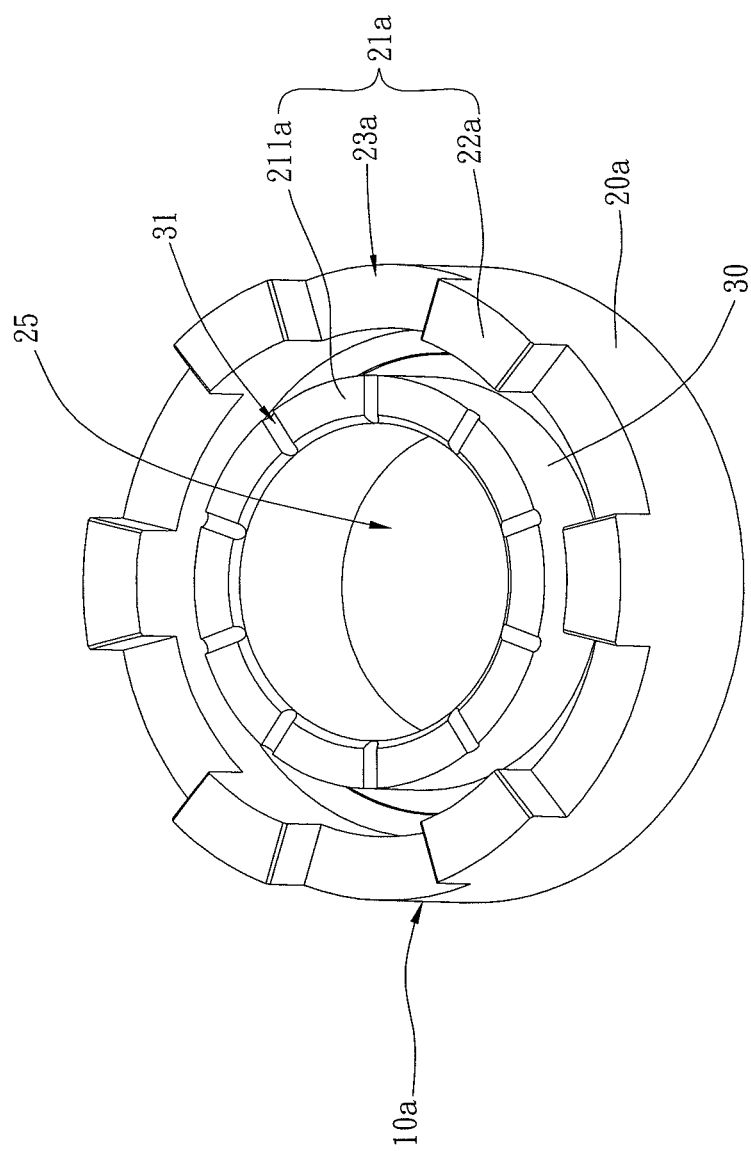
FIGS. 5A and 5B are schematic, isometric views of two units according to a second embodiment of the invention.
Figure 5B:
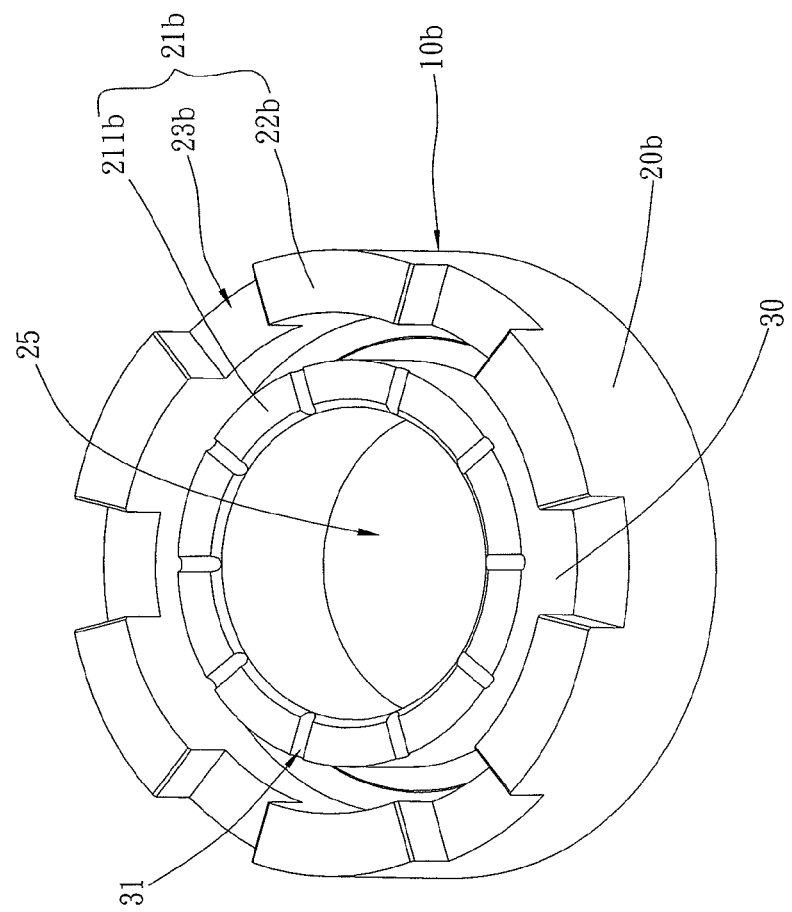
Figure 6:
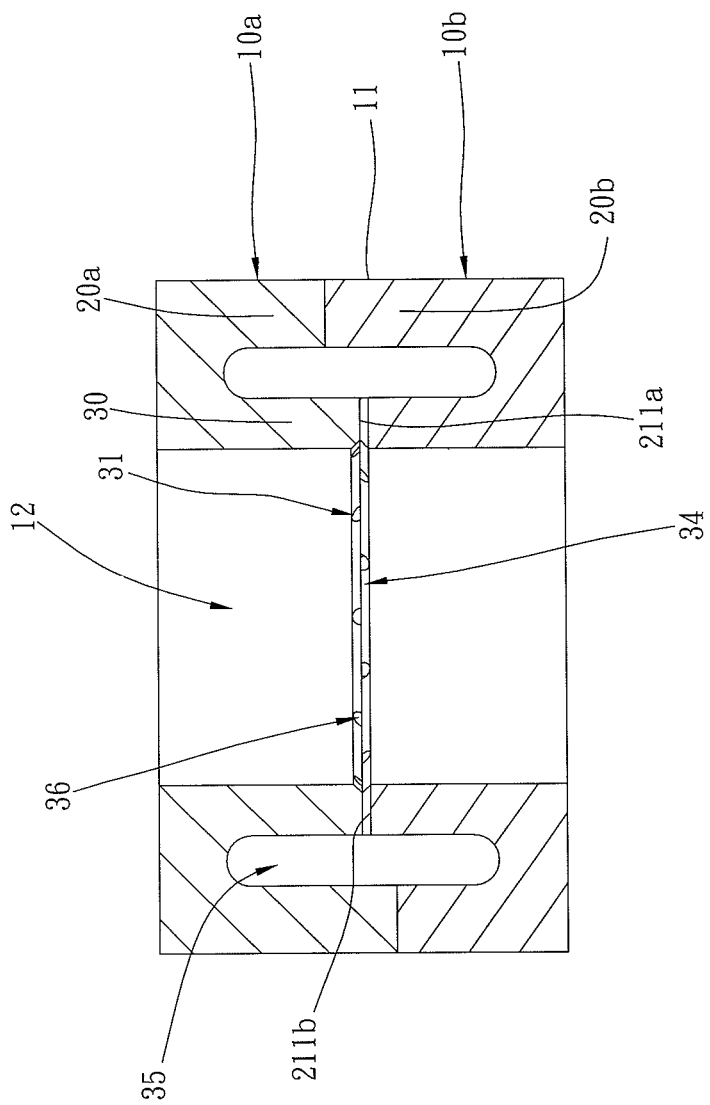
FIG. 6 is a cross section view of a bearing assembly coupled with the two units illustrated in FIGS. 5A and 5B.

Please refer to FIGS. 5A, 5B and 6 for a second embodiment of the invention. It differs from the first embodiment mainly on that the two abutting connection portions 21a and 21b mounted on the free ends of the outer walls 20a and 20b of the two adjacent units 10a and 10b are a plurality of tenons 22a and 22b and a plurality of slots 23a and 23b formed at different lengths and widths neighboring to each other and having complementary shapes. The two abutting connection portions 21a and 21b on their inner walls 30 have free end surfaces 211a and 211b each separated by a plurality of notches 31. Thus the bearing assembly is formed by the tenons 22a and 22b and the slots 23a and 23b on the two abutting outer walls 20a and 20b axially coupled with each other in an opposite manner, meanwhile, the free end surfaces 211a and 211b on the two abutting inner walls 30 connect to each other. Therefore, two sets of notches 31 between the two adjacent units 10a and 10b are formed a set of multiple staggered passages 36 communicated by the annular ditch 34.

Apparently, the tenons and the slots with complementary shapes between the two abutting connection portions of the invention may have various shapes, numbers and sizes depending on practical application. The profiles of the tenons and the slots depicted in the embodiments are merely examples and not the limitation of the invention.

Figure 7A:
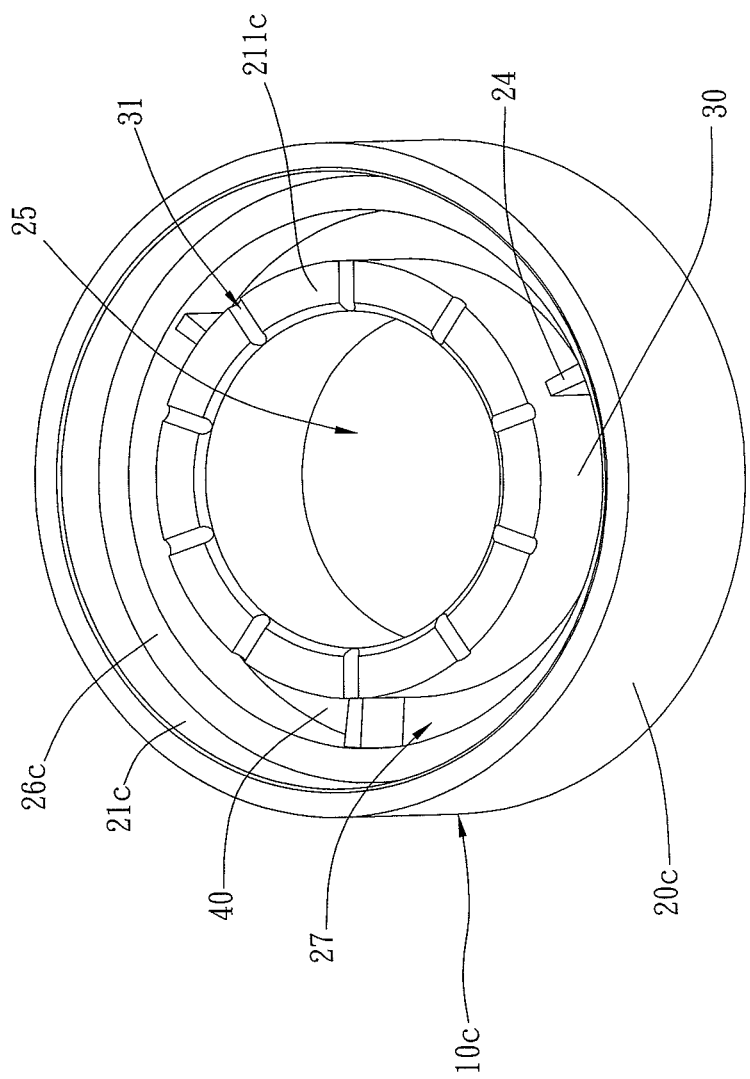
FIGS. 7A and 7B are schematic, isometric views of two units according to a third embodiment of the invention.
Figure 7B:
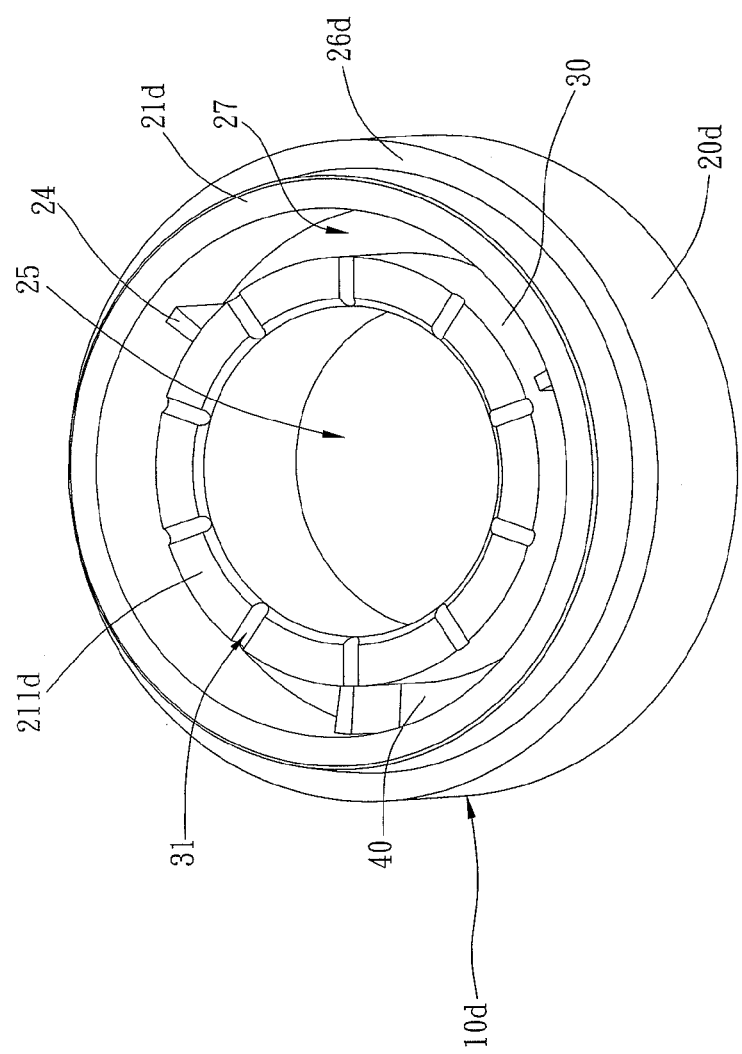
Figure 8:
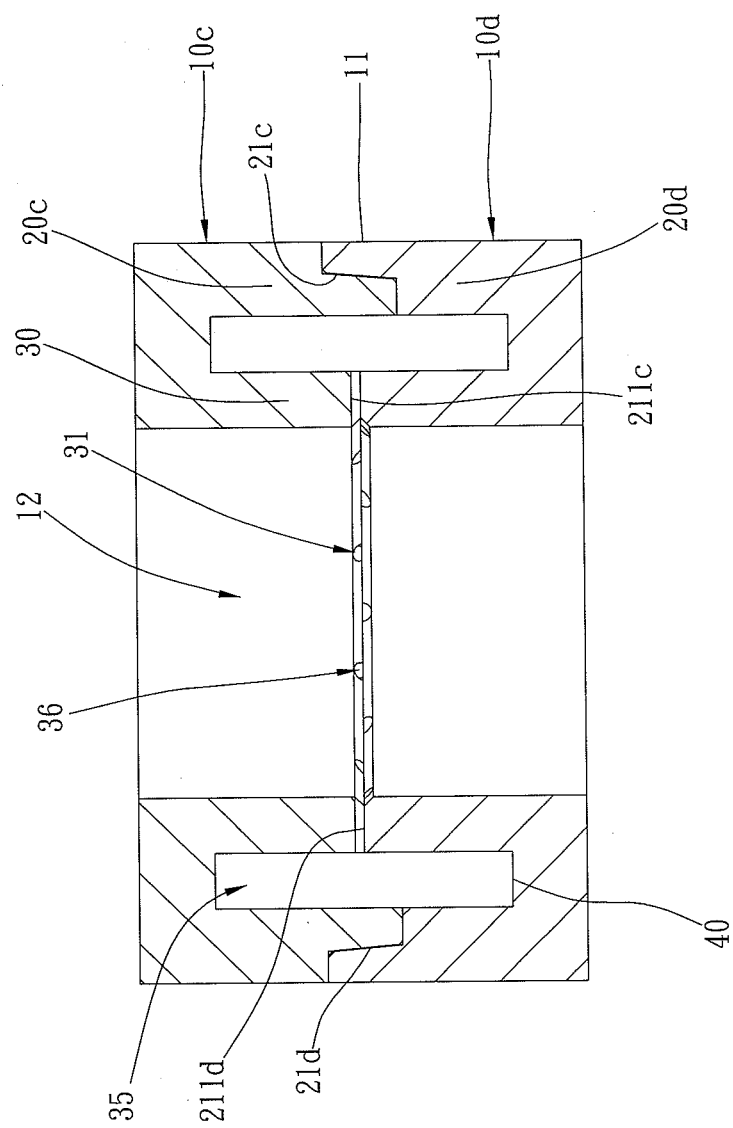
FIG. 8 is a cross section view of a bearing assembly coupled with the two units illustrated in FIGS. 7A and 7B.

Please refer to FIGS. 7A, 7B and 8 for a third embodiment of the invention. It differs from the aforesaid embodiments by having three reinforced ribs 24 in the groove 27 of the two units 10c and 10d to enhance the structural strength of the bearing assembly. The reinforced ribs 24 are preferably located between the abutting notches 31 and respectively fastened to the wall surfaces of the outer walls 20c and 20d, the inner walls 30 and the bottom walls 40 of each unit 10c and 10d, thereby dividing the groove 27 into three smaller independent grooves. In practice, the reinforced ribs 24 can be respectively formed at an elevation lower than that of the outer walls 20c and 20d and the inner walls 30 so that the three smaller grooves communicate with each other, and also can enhance the structural strength of the bearing assembly. In addition, the free ends of the outer walls 20c and 20d and the inner walls 30 also have connection portions 21c and 21d formed thereon complementary with each other in shapes. The connection portions 21c and 21d between the two adjacent units 10c and 10d are formed as one pair of annular steps 26c and 26d axially indented and respectively formed on the free end of the outer wall 20c of the unit 10c close to the axle hole 25 and on another free end of the outer wall 20d of the unit 10d away from the axle hole 25 to couple with each other. The annular steps 26c and 26d are complementary with each other in shapes to axially contact, meanwhile, the free end surfaces 211c and 211d of the inner walls 30 also contact to each other. When the units 10c and 10d are coupled with each other during assembly, no precise alignment is required for positioning of the notches 31 between the units 10c and 10d to form the staggered passages 36. Also, no precise alignment is required for positioning of the connection portions 21c and 21d between the units 10c and 10d. The multiple storage chambers 35 can be formed by the grooves 27 to evenly distribute the lubricating media.

The invention provides a bearing assembly capable of storing a large amount of diversified lubricating media. Through the diversified storage chamber and passages formed between different adjacent units that are coupled together in various styles, a uniform and stable tribology interface is formed between the shaft and the axial hole, which can extend and improve operation limit and lifespan of the bearing assembly.

The invention provides a production platform of the bearing assembly with a modular design and simplified mass production process. The units can be made with a simpler forming process and simpler molds for mass production. During assembly, the circumferential outer surface of the mounting portion is coupled tightly on an inner wall surface of a jutting chamber so that the axle holes are precisely and axially aligned to form the axial hole and total structural strength also can be enhanced. Also no complicated and precise radial positioning processes are needed for alignment of the passages on the abutting units. Hence production process can be simplified and mass production quality can be improved, and the cost can be reduced.

Figure 9:
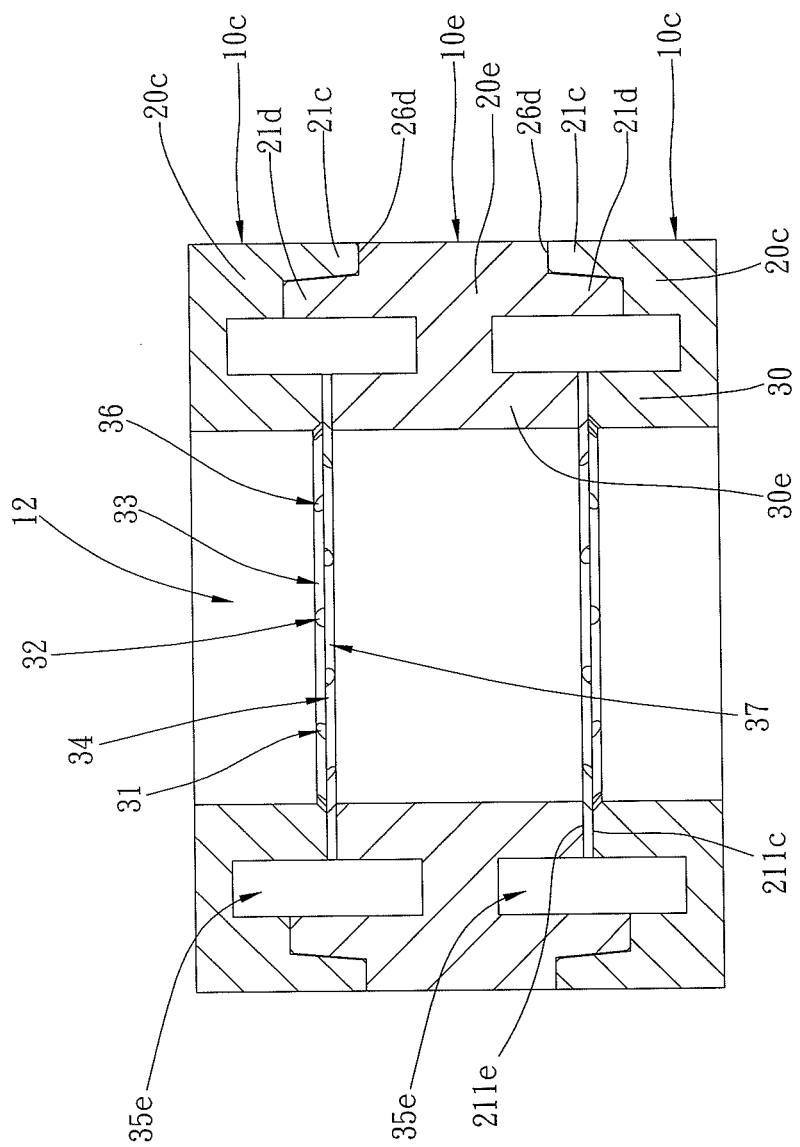
FIG. 9 is a cross section view of a bearing assembly according to a fourth embodiment of the invention.
Figure 10:
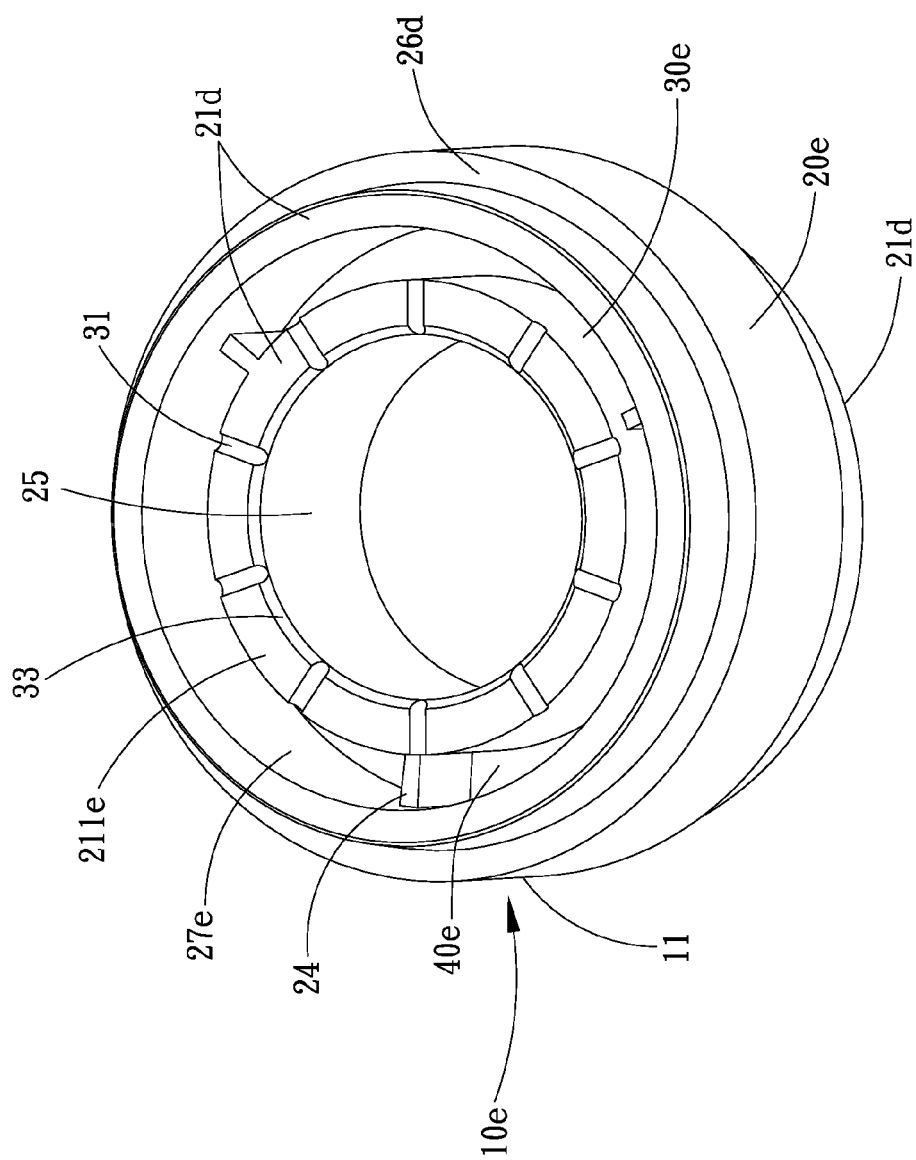
FIG. 10 is a schematic, isometric view of a unit installed in the middle of the bearing assembly illustrated in FIG. 9.

Please refer to FIGS. 9 and 10 for a fourth embodiment of the invention. It aims to enhance the extensibility of the loading length of the bearing assembly. The differences from the previous embodiments will be explained below. As shown in FIG. 10, the unit 10e has two grooves 27e that are formed by indenting axially on both ends of connection portions 21d towards a common bottom wall 40e and annularly formed between an outer wall 20e near the mounting portion 11 and an inner wall 30e near the axle hole 25. The inner wall 30e includes two free ends, each end has multiple notches 31 radially formed thereon and communicated with the grooves 27e and the axle hole 25. The unit 10e further has two trenches 33 formed on the wall surfaces at two ends of the axle hole 25 with the openings enlarged towards the two connection portions 21d. The bearing assembly includes two types of units 10c and 10e arranged in two pairs of two adjacent units 10c and 10e and two adjacent units 10e and 10c. The upper and lower units 10c have respectively one connection portion 21c of the outer wall 20c that is formed like the annular step 26c in the third embodiment. The middle unit 10e has two connection portions 21d at the upper and lower sides of the outer wall 20e that are formed like the annular step 26d in the third embodiment. Two pairs of two abutting connection portions 21c and 21d and two abutting connection portions 21d and 21c on the corresponding outer walls 20c and 20e and the corresponding outer walls 20e and 20c complementary with each other in shapes are axially contacted between the two pairs of the two adjacent units 10c and 10e and the two adjacent units 10e and 10c. Meanwhile, two pairs of two abutting free end surfaces 211c and 211e and two abutting free end surfaces 211e and 211c on the corresponding inner walls 30 and 30e and the corresponding inner walls 30e and 30 are contacted with each other. Such that, two storage chambers 35e are formed by joining two pairs of two abutting grooves 27 and 27e and two abutting grooves 27e and 27. Thus four sets of trenches 33 between the two pairs of the two adjacent units 10c and 10e and the two adjacent units 10e and 10c contain the corresponding four sets of recesses 32, jointly form two pairs of annular ditches 34 which contain the corresponding two pairs of passage ports 37, and four sets of notches 31 jointly form two pairs of staggered passages 36 communicating with the corresponding two pairs of annular ditches 34, thereby when the shaft 6 spins in the axial hole 12, a powerful dynamic pressure can be generated continuously to support the shaft 6 and replenish and recycle the lubricating media.

The extensibility of the invention provides a product platform of the bearing assembly with flexible design and applications. Through adjustments of various parameters, such as profile, number, size and arrangement of the units, and the profile, location, number and size of the passages, forms of the connection portions, form and number of the trench, number and capacity of the storage chamber, type and injection location of the lubricating media, different types of bearing assemblies can be developed and made in response to application requirements of diversified industries in different tribology conditions.

Figure 11:
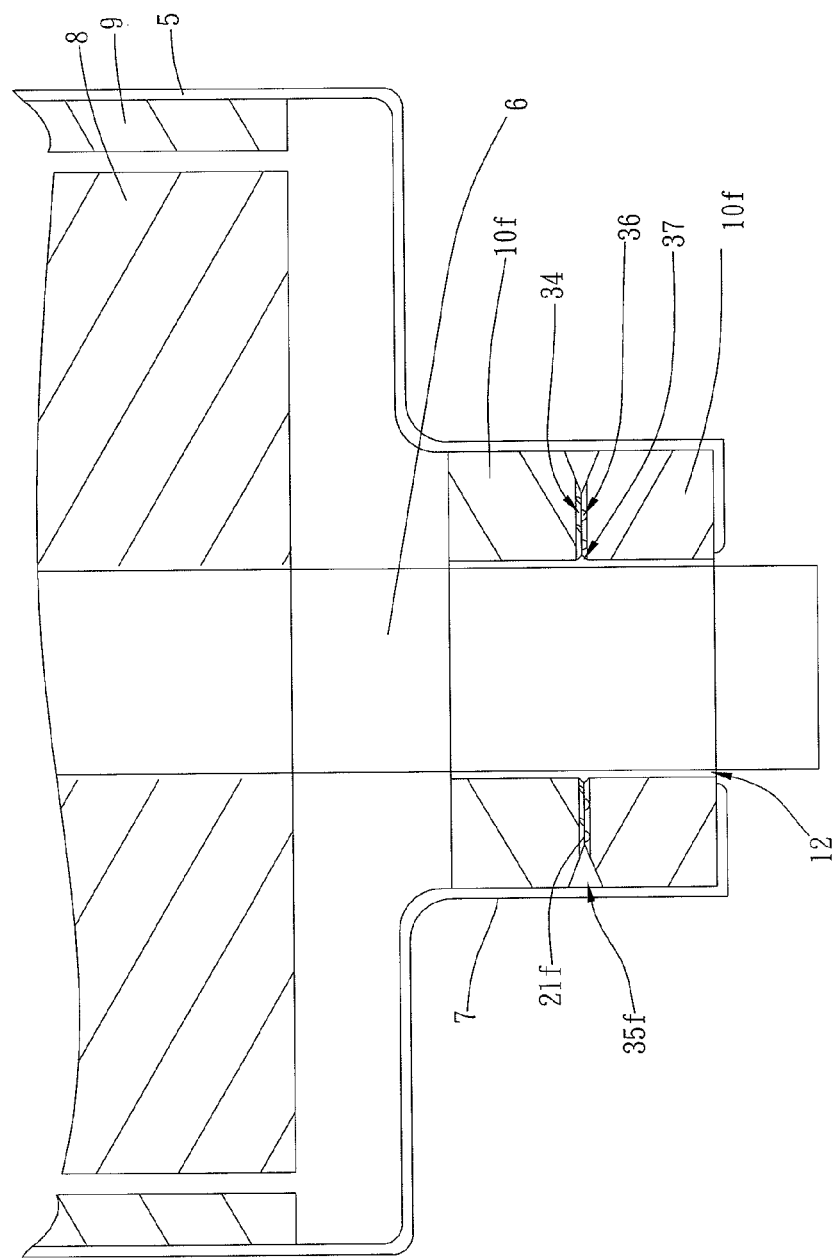
FIG. 11 is a cross section view of a bearing assembly installed on one end of a motor housing according to a fifth embodiment of the invention.
Figure 12:
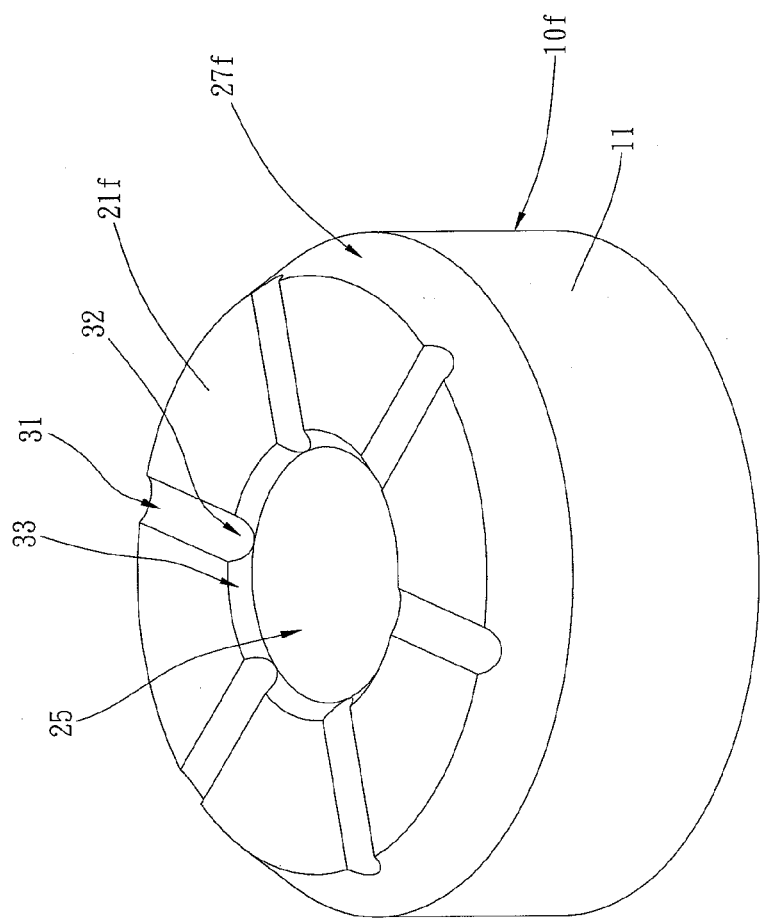
FIG. 12 is a schematic, isometric view of a unit illustrated in FIG. 11.

Please refer to FIGS. 11 and 12 for a fifth embodiment of the invention. The bearing assembly is formed by two identical barrel type units 10f with one set of abutting connection portions 21f contacting with each other. It differs from the previous embodiments mainly on the location of groove 27f formation in the unit 10f. Each unit 10f has a groove 27f indented from a free end surface of one of the two abutting connection portions 21f near the mounting portion 11. So that, similar to the previous embodiments, the cross section of the groove 27f in any radial direction is formed as an area no larger than that of the mounting portion 11 which has a largest peripheral outer surface. Also, the free end surface of the unit 10f close to the groove 27f forms the connection portion 21f and the free end surface of the connection portion 21f radially forms a plurality of notches 31 thereon communicating with the groove 27f and the axle hole 25. With the mounting portion 11 of the two units 10f coupled tightly on the inner wall surface of the jutting chamber 7 at each end of the motor housing 5, the two connection portions 21f with the complementary free end surfaces are coupled together so that the inner wall surface of the motor housing 5 and the two grooves 27f jointly form a storage chamber 35f, and two sets of the notches 31 form one set of staggered passages 36 communicating with the storage chamber 35f and the axial hole 12. Similarly, the two abutting trenches 33 covered the recesses 32 jointly form the passages 36 in the annular ditch 34 which also covers the passage ports 37 on the wall of the axial hole 12. Lubricating media can be filled from the axial hole 12 to pass through the passages 36 into the storage chamber 35f, and then the shaft 6 supported the motor stator 8 can run through a magnetic ring 9 on the inner wall of the motor housing 5 to be inserted into the axial hole 12 at two ends of the motor. Thereby, when the shaft 6 spins in the axial hole 12, a powerful dynamic pressure can be generated to support the shaft 6 and replenish and recycle of the lubricating media.

The bearing assembly of the invention can provide desirable loading length extensibility, and is adaptable to any pair of two adjacent units to make various arrangements required.

The embodiments disclosed above are only for example and should not be considered to be limiting to the invention.

The storage chamber formed between the two adjacent units for storing the lubricating media is adaptable to a storage chamber formed by a groove that is formed from indenting a free end surface anywhere of the connection portion of the at least one of the two adjacent units. The embodiments disclosed above are only for example and should not be considered to be limiting to the invention.

Further, the multiple passages formed between the two adjacent units for communicating the storage chamber and the axial hole is adaptable to a set of the multiple passages formed by a set of multiple notches that is formed on a free end surface of the connection portion of the at least one of the two adjacent units. The embodiments disclosed above are only for example and should not be considered to be limiting to the invention.

Moreover, the annular ditch formed on the wall surface of the axial hole between the two adjacent units as a communicating channel of the passages is adaptable to an annular ditch formed by a trench as a communicating channel of the notches that is formed on the wall surface of the axle hole of the at least one of the two adjacent units. The embodiments disclosed above are only for example and should not be considered to be limiting to the invention.

The bearing assembly of the invention can notably provide many advantages, such as the bearing assembly of the invention is made in a simplified structure with fewer elements and can be directly installed at two ends of a motor housing in the art for long term structural integrity without the need of an outer shell. It provides a product platform to make miniaturization of the bearing assembly so that the lubricating media can circulate between the storage chamber and the axial hole through the passages, and can be fabricated in mass production, and greatly reduce production cost and increase total structural strength, and also improve heat conductivity of tribology interface. It can further continuously generate powerful dynamic pressure and replenish and recycle the lubricating media, and can extend the number and capacity of the storage chamber in response to different shaft loading lengths. The types and injecting locations of the lubricating media also are alterable to meet application requirements of diversified motor industries.

In the aforesaid embodiments, forming of the passages can be made according to the following formula:

$$-2 \leq \log D \leq 0.5 \times \log(2 \times Sd \times H/N)$$

where N is the total number of passages in the bearing assembly, D is the equivalent hydraulic diameter of a single passage by millimeter (mm), Sd is the diameter of the axial hole by mm, and H is the length of the axial hole by mm.

While the preferred embodiments of the invention have been set forth for the purpose of disclosure, they are not the limitations of the invention, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A bearing assembly, comprising: at least two units, each unit including two opposite ends, each end forming a connection portion, the at least two units including at least one pair of two adjacent units being axially coupled together with one of the two adjacent units abutting against another one of the two adjacent units to allow at least one pair of two abutting connection portions of the at least one pair of the two adjacent units adapted to be contacted therebetween to form the bearing assembly, and a largest outer periphery between two connection portions of each unit forming a mounting portion, each unit further containing an axle hole axially running through the two opposite ends thereof, at least one trench with an enlarged opening being formed on at least one end of a wall surface of the axle hole directing towards at least one of the two connection portions of each unit, axle holes of the at least two units forming an axial hole of the bearing assembly for insertion of a spinning shaft;

wherein the at least one pair of two abutting connection portions forms at least one pair of at least one set of interfaces, each set of the interfaces having complementary shapes, at least one groove and at least one set of multiple notches being formed between the at least one pair of the two adjacent units of the bearing assembly, an outer periphery of the at least one groove having smaller radial dimension than the mounting portion, mounting portions of the bearing assembly being fixedly encased in and fully contacted with an inner periphery of a jutting chamber located at a center of each of two ends of a motor housing in the art, the at least one set of multiple notches being annularly distributed on at least one of the two abutting connection portions of the bearing assembly and communicating with the at least one groove and the at least one trench and the axle hole, the at least one groove forming at least one storage chamber of the bearing assembly to store lubricating media therein, the at least one set of multiple notches forming at least one set of multiple passages of the bearing assembly to communicate with the at least one storage chamber and the axial hole.

2. The bearing assembly of claim 1, wherein the at least one trench communicates with at least one set of multiple recesses corresponding to the at least one set of multiple notches on the wall surface of the axle hole.

3. The bearing assembly of claim 2, wherein the at least one trench forms at least one annular ditch of the bearing assembly which communicates with at least one set of multiple passage ports corresponding to the at least one set of multiple passages on a wall surface of the axial hole.

4. The bearing assembly of claim 1, wherein the at least one groove is axially indented from the at least one of the two abutting connection portions to a bottom wall thereof and formed between at least one inner wall near the axle hole and at least one outer wall near the mounting portion, the at least one set of multiple notches located annularly distributed on at least one of two abutting free end surfaces of the at least one inner wall, the at least one set of interfaces consisting of two sets of the interfaces.

5. The bearing assembly of claim 4, wherein one of the two sets of the interfaces is a pair of complementary tenons and slots neighboring each other being respectively formed on a free end surface of the at least one outer wall and another one of the two sets of the interfaces is a pair of complementary surfaces being respectively formed on a free end surface of the at least one inner wall.

6. The bearing assembly of claim 4, wherein one of the two sets of the interfaces is a pair of complementary annular steps being respectively formed on a free end surface of the at least one outer wall and another one of the two sets of the interfaces is a pair of complementary surfaces being respectively formed on a free end surface of the at least one inner wall.

7. The bearing assembly of claim 4, wherein the at least one groove is bridged by a plurality of reinforced ribs between the at least one outer wall and the at least one inner wall.

8. The bearing assembly of claim 1, wherein the at least one groove is radially indented from the mounting portion towards the at least one of the two abutting connection portions.

9. The bearing assembly of claim 8, wherein the at least one set of interfaces consists of one set of the interfaces which is a pair of complementary surfaces being respectively formed on a free end surface of the two abutting connection portions.

10. The bearing assembly of claim 1, wherein the at least one set of multiple passages is arranged and expressed according to the following formula:

$$-2 \leq \log D \leq 0.5 \times \log(2 \times Sd \times H/N)$$

where N is total number of the at least one set of multiple passages in the bearing assembly, D is an equivalent hydraulic diameter of a single passage by millimeter (mm), Sd is a diameter of the axial hole by mm, and H is a length of the axial hole by mm.

* * * * *